UNITED STATES PATENT OFFICE.

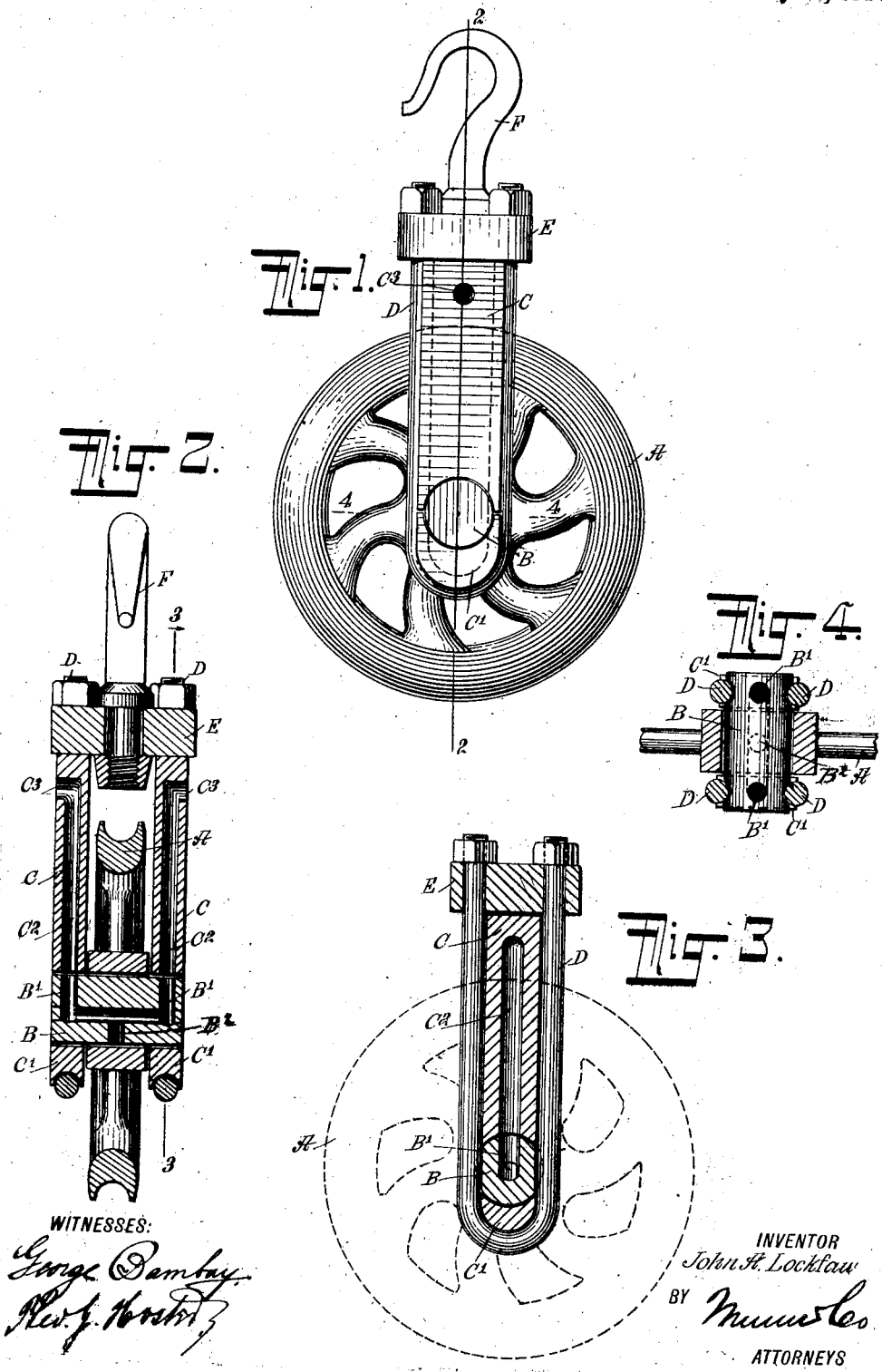

JOHN ANTHONY LOCKFAW, OF WILMINGTON, NORTH CAROLINA.

SHEAVE-BLOCK.

964,284.    Specification of Letters Patent.    Patented July 12, 1910.

Application filed January 19, 1910.   Serial No. 538,825.

*To all whom it may concern:*

Be it known that I, JOHN A. LOCKFAW, a citizen of the United States, and a resident of Wilmington, in the county of New Hanover and State of North Carolina, have invented a new and Improved Sheave-Block, of which the following is a full, clear, and exact description.

The object of the invention is to provide a new and improved sheave block, for use on board ship, on logging machinery, etc., and which is simple and durable in construction, exceedingly strong, not liable easily to get out of order, and arranged to insure proper oiling.

For the purpose mentioned, a top cross bar is engaged by the ends of U-shaped bolts engaging side pieces, and an axle on which the sheave is mounted to turn.

A practical embodiment of the invention is represented in the accompanying drawings, forming a part of this specification, in which similar characters of reference indicate corresponding parts in all the views.

Figure 1 is a side elevation of the sheave block; Fig. 2 is a transverse section of the same on the line 2—2 of Fig. 1; Fig. 3 is a sectional side elevation of the same on the line 3—3 of Fig. 2; and Fig. 4 is a sectional plan view of the same on the line 4—4 of Fig. 1.

A sheave or pulley A, is mounted to turn on a fixed axle B, engaged on opposite sides of the sheave A by sectional side pieces, each formed of a top side piece C and a bottom side piece or cap C', as plainly indicated in the drawings. The side pieces C, C' are provided along their edges with grooves engaged by U-shaped bolts D, also engaging a top cross piece E provided with a hook F, fixed or mounted to turn in the cross piece E. The top cross pieces C abut against the under side of the top cross piece E, so that when the nuts of the bolts D are screwed up, the side pieces are securely held in place, thus firmly supporting the axle B. The side arms of the bolts D extend through grooves formed in the sides of the axle B, so that the latter is held against turning in the side pieces C, C'. It is understood that the side pieces C and C' are provided with semicircular grooves, fitting onto the top and bottom portions of the axle B, to form a firm bearing for the outer ends of the axle B.

Each of the top side pieces C is provided with a vertically disposed oil well hole $C^2$, registering at its lower end with a U-shaped channel $B'$ having an outlet $B^2$ and formed in the axle B, and the upper end $C^3$ of each oil well $C^2$ extends to the outer face of the corresponding top side piece C, to permit of filling the oil well hole with oil and waste, thus insuring a proper oiling of the sheave A on the axle B, it being understood that the oil readily passes out of the oil well outlet in the bottom of the axle B, to oil the contacting surfaces of the sheave A and the axle B.

The sheave block shown and described is very simple and durable in construction, and the several parts forming the block proper are securely fastened together so as to render the block exceedingly strong and durable.

Having thus described my invention, I claim as new and desire to secure by Letters Patent:

1. A sheave block, comprising a sheave, an axle for the sheave to turn on and provided near the ends with grooves, sectional side pieces engaging the said axle and having grooves, a cross bar for the side pieces to abut against, and U-shaped bolts engaging the said cross bar and the grooves in the said axle and side pieces to fasten the parts together.

2. A sheave block, comprising a sheave, an axle for the sheave to turn on and provided near the ends with grooves, the axle having a U-shaped channel provided with an outlet, sectional side pieces engaging the said axle and having grooves, the upper sections of the said side pieces having oil well holes in register with the ends of the said channel in the said axle, a cross bar for the side pieces to abut against, and U-shaped bolts engaging the said cross bar and the grooves in the said axle and side pieces, to fasten the parts together.

3. In a sheave block, an axle for the sheave to turn on, sectional side pieces engaging the axle at each end thereof, the axle being between the sections of the side pieces, a U-shaped bolt for each side piece, the edges of the said pieces being grooved to receive the bolts, and a cross piece to which the bolts are connected.

4. In a sheave block, an axle for the sheave to turn on, sectional side pieces engaging the ends of the axle, a cross bar against which the end of one section of each side piece abuts, and a substantially U-shaped bolt connecting each side piece to the cross piece, the edges of the sections being grooved to receive the bolts, the axle having a U-shaped passage and the upper section of each side piece having a passage adapted to register with one end of the passage in the axle, the said passage opening at the side of the side piece.

In testimony whereof I have signed my name to this specification in the presence of two subscribing witnesses.

JOHN ANTHONY LOCKFAW.

Witnesses:
ESTELLE SHRIER,
EGBERT K. BRYAN.